United States Patent [19]

Hicks et al.

[11] Patent Number: 4,462,208
[45] Date of Patent: Jul. 31, 1984

[54] REGENERATION CONTROL SYSTEM FOR A DIESEL ENGINE EXHAUST PARTICULATE FILTER

[75] Inventors: Robert H. Hicks, Leonard; Steve M. Senko, Clawson; Roland J. Budenaers, Taylor; Richard L. Teno, East Detroit, all of Mich.

[73] Assignee: General Motors Corporation, Detroit, Mich.

[21] Appl. No.: 421,780

[22] Filed: Sep. 23, 1982

[51] Int. Cl.³ .................................................. F01N 3/02
[52] U.S. Cl. .......................................... 60/286; 60/297; 60/303; 60/311; 73/38
[58] Field of Search ................... 60/274, 286, 303, 297, 60/311; 73/38

[56] References Cited

U.S. PATENT DOCUMENTS

| 3,412,786 | 11/1968 | Taylor | 73/38 |
| 4,198,853 | 4/1980 | Graham | 60/311 |
| 4,335,574 | 6/1982 | Sato | 60/303 |
| 4,381,643 | 5/1983 | Stark | 60/303 |

FOREIGN PATENT DOCUMENTS

| 56-510 | 1/1981 | Japan | 60/311 |

*Primary Examiner*—Douglas Hart
*Attorney, Agent, or Firm*—Howard N. Conkey

[57] ABSTRACT

An apparatus for igniting the particulates trapped in a particulate filter used with a diesel engine supplied with fuel with an agent for reducing the ignition temperature of the particulate when it is determined that a predetermined concentration of particulates at which the particulates will undergo self-sustained combustion have accumulated in the filter.

1 Claim, 8 Drawing Figures

REGENERATION CONTROL SYSTEM FOR A DIESEL ENGINE EXHAUST PARTICULATE FILTER

This invention relates to diesel engine exhaust gas treatment and in particular to a regeneration system for periodically incinerating collected particulates in an exhaust gas particulate filter.

It is known in the art to provide a diesel engine with a particulate filter to collect particulates from the exhaust gas stream during engine operation. Such particulates consist largely of carbon particles which, with continued engine operation, tend to plug the filter causing a restriction to normal exhaust gas flow and eventually adversely affecting engine operation. Such a restriction may be avoided by periodically cleaning the particulates from the exhaust gas filter.

Various methods for cleaning the particulates from an exhaust filter have been proposed. One suggested method is to increase the diesel engine exhaust gas temperature by throttling the engine intake air to a level at which the trapped particulates in the filter are incinerated. Another suggested method is to increase the engine exhaust gas temperature to the combustion temperature of the collected particulates by injecting and burning fuel or gas at a point upstream of the particulate filter.

In the prior systems mentioned above, it is necessary to increase and maintain the exhaust gas temperature to a high value above 500° C. for the period required to incinerate all of the particulates in the exhaust gas filter. The shortcomings of the foregoing methods are their complexity and amount of energy input required to initiate and complete the incineration of the exhaust gas particulates.

In order to alleviate the shortcomings of the foregoing systems, it has been suggested to add an agent to the diesel fuel which lowers the ignition and combustion temperature of the particulates so that they will undergo spontaneous ignition at the operating temperatures of the diesel engine exhaust gas without the requirement of engine throttling or the burning of fuel or gas in the exhaust upstream of the filter. For example, it has been suggested to add copper naphthanate as an agent to the diesel fuel which lowers the ignition and combustion temperature of the particulates produced within the diesel engine and subsequently trapped in the particulate filter to around 200° C. However, even with such an agent added to the diesel fuel to lower the combustion temperature of the trapped particulates, there still remains certain engine operating modes during which the engine exhaust temperature does not attain even the lower kindling temperature of the trapped particulates. Cold engine operation and low engine load conditions are two such operating modes. Therefore, even when an agent such as copper naphthanate is added to the diesel fuel to lower the ignition and combustion temperature of the trapped particulates, there are times when burn-off of the particulates in the particulate filter must be provided for.

We have found that if the particulates formed by combustion of diesel fuel with an agent added as above described are allowed to build to a predetermined minimum concentration in the particulate filter, which may take the form of a ceramic honeycomb filter, they will undergo self-sustained combustion even with an exhaust gas temperature below the particulate combustion temperature if they are first ignited at least at one point on the filter. The present invention provides for an apparatus for igniting the particulates trapped in a particulate filter used with a diesel engine supplied with fuel with an agent added thereto to reduce the ignition temperature of the particulates emitted thereby when it is determined that the particulates have accumulated in the particulate filter at a predetermined concentration at which the particulates will undergo self-sustained combustion. By igniting the trapped particulates when the predetermined concentration has been attained so that self-sustained combustion results, it is unnecessary to provide the large amount of energy input previously required to initiate and complete the combustion of the particulates in the particulate filter.

In accord with the foregoing, it is the general object of this invention to provide an improved apparatus for periodically burning the particulates contained in a diesel engine particulate filter having low energy output requirements.

It is another object of this invention to provide a system for igniting the particulates in a diesel engine exhaust gas particulate filter produced through the combustion of a fuel and an agent added thereto for reducing the combustion temperature of the particulates when the accumulation of particulates in the filter attains a predetermined concentration at which the particulates undergo self-sustained combustion after ignition.

It is another object of this invention to provide a system as set forth in the foregoing objects wherein engine operating conditions are monitored to determine when the particulates trapped in the particulate filter have attained the predetermined concentration at which they undergo self-sustained combustion after ignition.

The foregoing objects of this invention may be best understood by reference to the following description of a preferred embodiment and the drawings in which.

Figure 1:
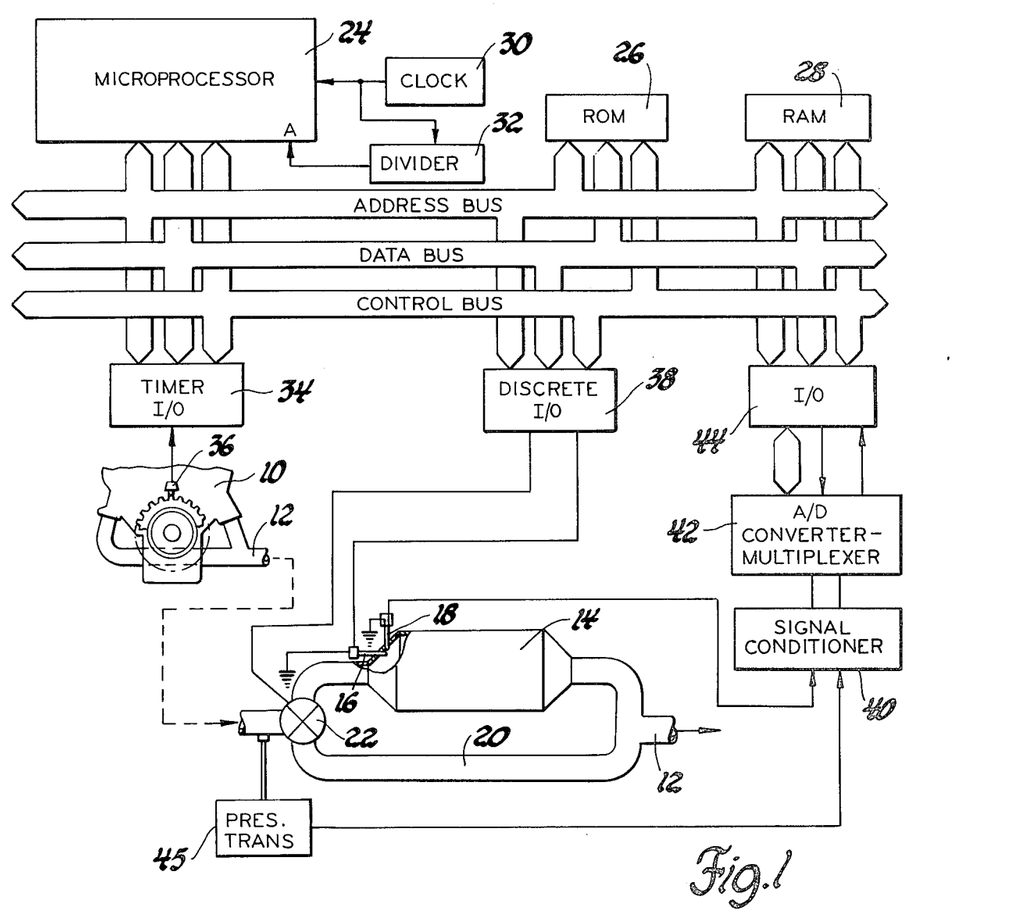
FIG. 1 is a diagram of a digital controller for monitoring engine operating parameters and initiating combustion of the particulates in a particulate filter in accord with the principles of this invention.

Referring to FIG. 1, there is illustrated generally a diesel engine 10 that is supplied with fuel to undergo combustion. The combustion byproducts are discharged into an exhaust pipe 12 in which there is mounted a particulate filter 14 through which the combustion byproducts are normally required to pass. The filter element or elements in the particulate filter 14 may be made of any suitable material and configuration capable of trapping and holding particulates from the engine exhaust gases. For example, the filter element may take the form of a monolithic ceramic structure through which the exhaust gases must pass prior to discharge to the atmosphere. The particulates are trapped and accumulate on the walls of the ceramic structure where they remain until they are burned off in accord with the principles of this invention and as will be subsequently described.

The fuel supplied to the diesel engine 10 includes an agent such as copper naphthanate which effectively lowers the combustion temperature of the carbon particulates produced within the diesel engine 10 and subsequently trapped in the particulate filter 14. In one embodiment, copper naphthanate was added at a concentration of 0.25 grams per gallon of fuel. Periodically, the trapped carbon particulates are ignited and burned by the heat of the exhaust gases from the diesel engine 10. However, during certain engine operating conditions such as during cold engine operation or during low load conditions, the exhaust gas temperatures are too cold to ignite and burn the trapped particulates in the filter 14 even with the lower combustion temperature resulting from the agent added to the diesel fuel. The control system of this invention is operative to ignite the carbon particulates within the particulate filter 14 under these conditions.

Applicants have recognized that if the carbon particulates resulting from combustion of fuel with the aforementioned agent are allowed to build to a predetermined concentration on the walls of the filter within the particulate trap 14, the particulates will undergo self-sustained combustion, once ignited, to completely incinerate all of the carbon particulates and does not require the sustained input of large amounts of energy to complete the burning process. It has been found that when the carbon particulates have accumulated to a thickness of 0.060 inches on the walls of the filter element, self-sustained combustion after ignition will occur. Therefore, in accord with this invention, an engine operating parameter indicative of exhaust gas flow output of the diesel engine 10 and the pressure upstream of the particulate filter 14 are monitored to determine when the carbon particulates in the filter 14 have accumulated at least to the predetermined concentration which will support self-sustained combustion after ignition. When it is determined that such a concentration exists, the particulates are ignited after which they are allowed to burn via self-sustained combustion to regenerate the particulate filter 14.

In general, the system of FIG. 1 includes a digital controller that monitors the speed of the diesel engine 10 as the parameter indicative of exhaust gas flow and the pressure in the exhaust pipe 12 upstream of the particulate filter 14. When the pressure upstream of the particulate filter 14 at the existing engine speed is indicative of an accumulation of carbon particulates in the filter 14 of the predetermined concentration, a glow plug 16 mounted in the filter 14 is energized until it is heated to the ignition temperature of the carbon particulates. This temperature is sensed by a thermocouple 18 also mounted in the particulate filter 14. After the glow plug 16 has initiated ignition, it is then deenergized and the particulates within the particulate filter 14 undergo self-sustained combustion to provide for complete regeneration. During the period that the glow plug 16 is energized to ignite the carbon particulates, the exhaust gases from the engine 10 are bypassed around the particulate filter 14 via a bypass conduit 20. An electromagnetic valve 22 that is normally positioned to close off the bypass 20 is moved when energized to close off the exhaust path into the particulate filter 14 and to bypass the exhaust gases around the filter 14. After ignition of the carbon particulates, the valve 22 is deenergized to again steer the exhaust gases through the particulate filter 14.

Figures 7, 8:
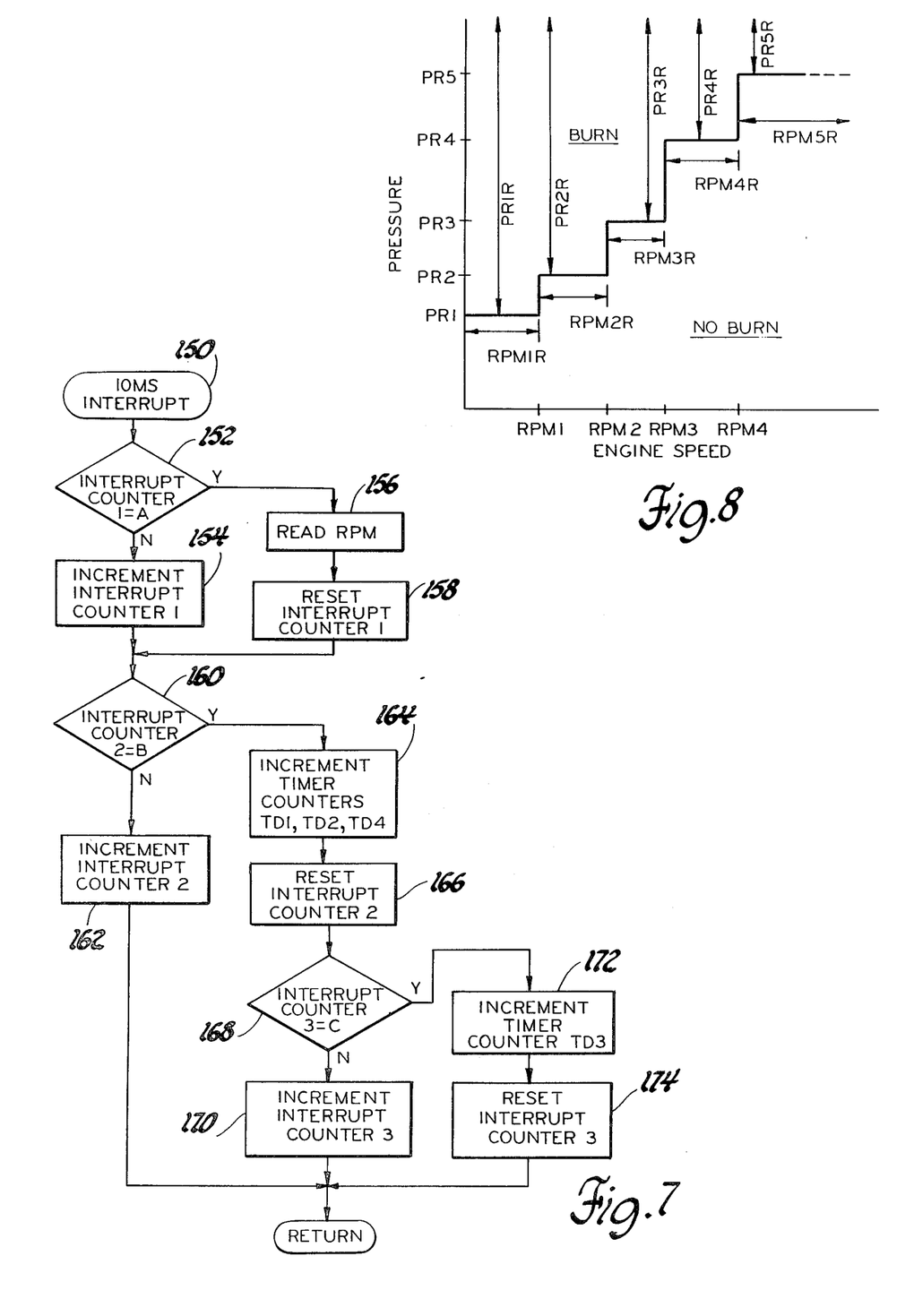
FIG. 8 is a diagram illustrating engine operating conditions indicative of a concentration of collected particulates that will undergo self-sustained combustion.

Referring to FIG. 8, there is illustrated the conditions of engine speed and the pressure upstream of the particulate filter 14 that are indicative of a collection of carbon particulates of the predetermined concentration at which they will undergo self-sustained combustion. In this embodiment, the engine operating speed is divided into five speed ranges. Within each speed range, when the pressure upstream of the particulate filter 14 attains a pressure level associated with that speed range, the conditions are indicative of an accumulation of carbon particulates of the predetermined concentration. For example, if the engine speed is within the range RPM2R between the speeds RPM1 and RPM2, a pressure upstream of the particulate filter 14 greater than PR2 is indicative of an accumulation of carbon particulates in the filter 14 at the predetermined concentration at which the carbon particulates will undergo self-sustained combustion when ignited. The digital controller of FIG. 1 monitors the values of pressure and speed and provides for the energization of the glow plug 16 to initiate combustion of the carbon particulates when the operation is in the burn region as indicated in FIG. 8. It is understood, however, that the engine speed ranges may be broken down into any number of ranges greater than or less than the five ranges illustrated in FIG. 8 and further may include interpolation between break points so that there is a continuous variation in the pressure that is indicative of the predetermined concentration of carbon particulates in the filter 14 over the entire engine operating speed range.

Referring again to FIG. 1, the digital controller for controlling the energization of the glow plug 16 to ignite the carbon particulates trapped by the filter 14 includes a microprocessor 24 which executes the various control and monitoring functions by executing an operating program permanently stored in a read-only memory (ROM) 26. The ROM 26 also contains various constants utilized during execution of the operating program to perform the control functions. Internal to the microprocessor 24 are conventional counters, registers, accumulators, flag flip flops, etc.

The digital controller also includes a random access memory (RAM) 28 into which data may be temporarily stored and from which data may be read at various address locations determined in accord with the program stored in the ROM 26. A clock oscillator 30 supplies a clock signal to the microprocessor 24 which establishes the timing of the digital controller operation. The clock signal is also supplied to a divider 32 which issues a periodic interrupt pulse to a maskable interrupt input A of the microprocessor 24. These interrupt pulses may be, for example, at 10 millisecond intervals.

A timer input/output circuit is provided that includes an input counter section which counts input pulses for a predetermined time period or, alternatively, counts clock pulses between input pulses to determine the frequency of input pulses for measuring engine speed. In this respect, a speed pickup 36 monitors rotation of the flywheel of the diesel engine 10 and provides pulses at a frequency representing engine speed to the timer input/output circuit 34.

A discrete input/output circuit 38 is provided having an output discrete section for issuing output discrete signals. For example, the output discrete section of the circuit 38 may include flip flops set to provide an output signal and reset to terminate the output signal. One output of the circuit 38 is coupled to the glow plug 16 and a second output is coupled to the valve 22. By issuing output signals, the discrete input/output circuit 38 can selectively energize the glow plug 16 and selectively energize the valve 22 to bypass the exhaust gases around the particulate filter 14.

To provide for the measurement of analog signals, the digital controller includes a signal conditioner 40 which receives analog signals and whose outputs are coupled to an analog-to-digital converter multiplexer 42. The particular analog condition sampled and converted is controlled by the microprocessor 24 in accord with the operating program via address lines from the input/output interface of an input/output circuit 44. Upon command, the addressed condition is converted to digital form and supplied to the input/output circuit 44 and then stored in ROM designated memory locations in the RAM 28. The analog signals supplied to the signal conditioner 40 are the temperature at the glow plug 16 provided by the thermocouple 18 and the pressure upstream of the particulate filter 14 provided by a pressure transducer 45 pneumatically coupled to the exhaust pipe 12 to monitor the pressure therein.

The circuits 34, 38 and 44 are conventional circuits for providing the respective functions. While the circuits have been illustrated as being separate, they may be combined in one or more input/output interface circuits.

The microprocessor 24, the ROM 26, the RAM 28 and the input/output circuits 34, 38 and 44 are interconnected by an address bus, a data bus and a control bus. The microprocessor 24 accesses the various circuits and memory locations in the ROM 26 and the RAM 28 via the address bus. Information is transmitted between circuits via the data bus and the control bus includes conventional lines such as read/write lines, reset lines, clock lines, power supply lines, etc.

In general, the digital controller monitors the output of the pressure transducer 45 and the engine speed represented by the output signal from the transducer 36 and determines when these conditions represent a buildup of carbon particulates in the particulate trap 14 at a predetermined concentration that will undergo self-sustained combustion after ignition. When this concentration is detected, the bypass valve 22 is energized to bypass the exhaust gases around the particulate filter 14 and the glow plug 16 is energized. The bypass around the particulate trap 14 is provided so that the exhaust gases do not cool the glow plug 16 and slow down or prevent it from attaining the ignition temperature of the particulates in the filter 14. When the glow plug temperature increases to the ignition temperature of the carbon particulates in the filter 14 as sensed by the thermocouple 18, the valve 22 is deenergized to again route the exhaust gases through the filter 14. Sometime thereafter, the glow plug 16 is deenergized. The particulates being of the required concentration undergo self-sustained combustion to completely regenerate the particulate filter 14.

Figure 2:
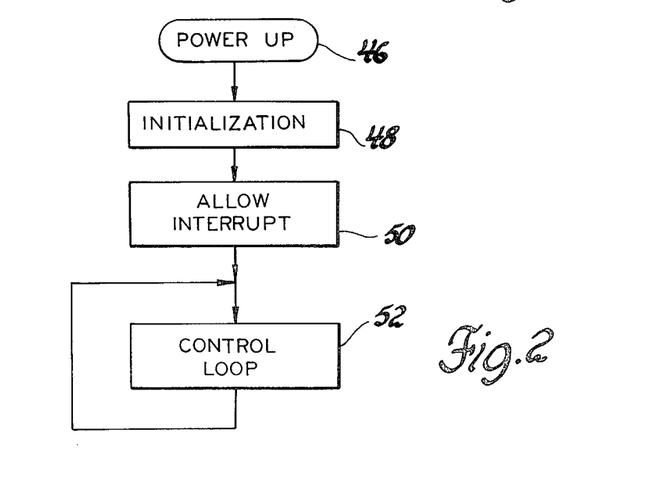
FIGS. 2 through 7 are diagrams illustrative of the operation of the digital controller of FIG. 1.

Referring to FIG. 2, when power is first applied to initiate manual start of the diesel engine 10 and to apply power to the various circuits, the computer program is initiated at point 46 and then proceeds to step 48 where the computer provides for initialization of the system. For example, at this step, counters, flags and timers are initialized. After the initialization step 48, the program proceeds to step 50 where the program allows interrupts to occur such as by resetting the interrupt mask bit in the microprocessor condition code register. After this step, the program shifts to a control loop 52 which is continuously repeated. This loop provides for the control of the ignition of the carbon particulates in the trap 14.

While the system may employ numerous program interrupts at various spaced intervals, it will be assumed for purposes of illustrating this invention that a single interrupt is provided at 10 millisecond intervals by means of the divider 32 of FIG. 1.

Figure 3:
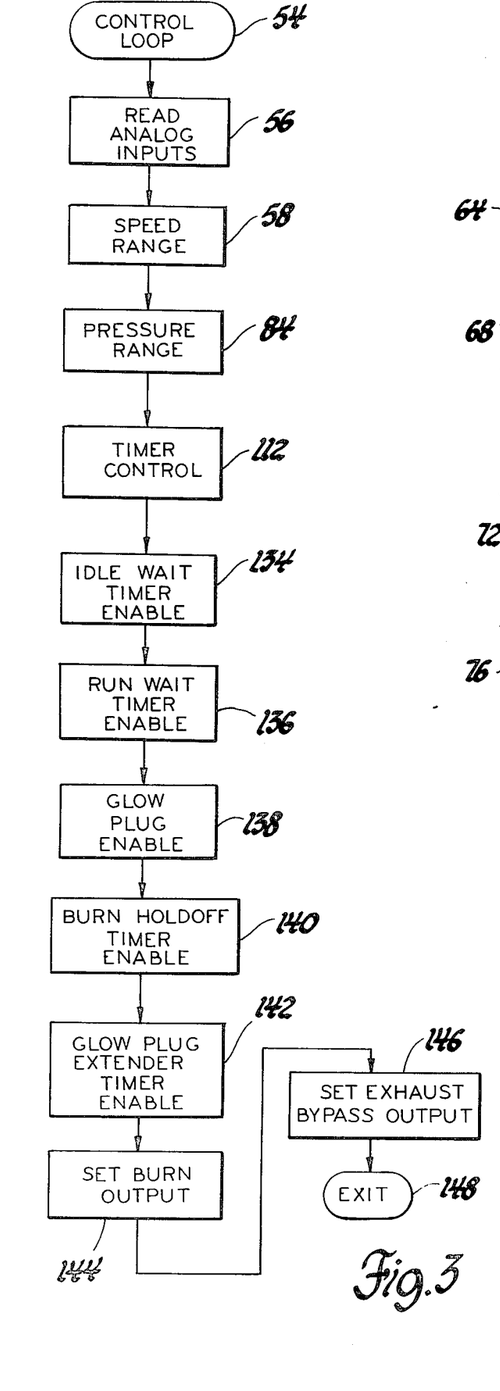

Referring to FIG. 3, the control loop 52 of FIG. 2 is illustrated. The control loop is entered at point 54 and proceeds to a step 56 where the analog inputs to the analog-to-digital converter-multiplexer 42 are converted thereby into digital numbers representative of the analog signal values of pressure and temperature provided by the pressure transducer 46 and the thermocouple 18. These digital numbers are stored in respective ROM designated memory locations in the RAM 28.

Figure 4:
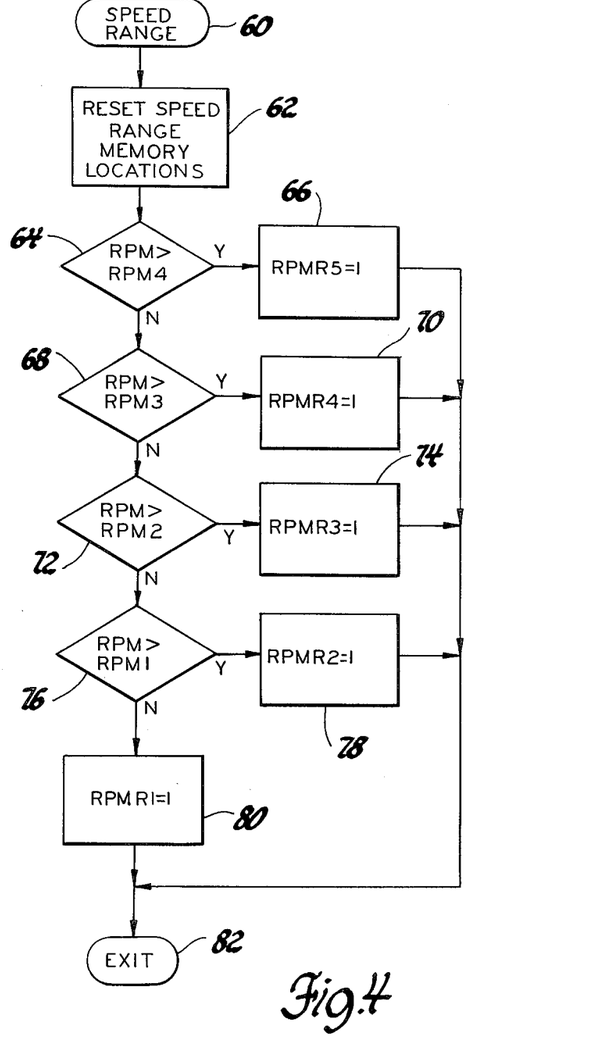

From step 56, the program proceeds to a step 58 where a speed range determining routine is executed to determine which range the engine speed (sampled in the interrupt routine to be described) falls. This routine is illustrated in greater detail in FIG. 4. Referring to FIG. 4, the speed range routine is entered at point 60 and proceeds to a step 62 where five speed range memory locations in the RAM 28 are reset. These RAM memory locations are identified by and represent speed ranges RPMR1 through RPMR5. These speed ranges are illustrated in FIG. 8.

From step 62 the program proceeds to a decision point 64 where the actual engine speed is compared with a calibration constant RPM4 that separates the speed ranges RPMR4 and RPMR5. If the actual engine speed is greater than RPM4, the program proceeds to step 66 where the memory location representing speed range RPMR5 is set to indicate the engine speed is in that speed range. If the engine speed is less than RPM4, the program proceeds to a decision point 68 where the engine speed is compared with a calibration constant RPM3 that separates the speed ranges RPMR3 and RPMR4. If the actual speed is greater than RPM3, the program proceeds to step 70 where the memory location representing speed range RPMR4 is set to indicate the engine speed is in that range. If the engine speed is less than RPM3, the program proceeds to a decision point 72 where the speed is compared with a calibration value RPM2 that separates the speed ranges RPMR2 and RPMR3. If the actual speed is greater than RPM2, the program proceeds to step 74 where the memory location representing speed range RPMR3 is set to indicate the engine speed is in that range. If the actual speed is less than RPM2, the program proceeds to a decision point 76 where the speed is compared with a calibration value RPM1 that separates the speed ranges RPMR1 and RPMR2. If the actual speed is greater than RPM1, the program proceeds to step 78 where the memory location representing speed range RPMR2 is set to indicate the engine speed is in that range. If the actual speed is less than RPM1, the program proceeds to step 80 where the memory location representing engine speed range RPMR1 is set to indicate the engine speed is in that range. From the step 66, 70, 74, 78 or 80, the program exits the speed range determining routine at point 82. Following completion of this routine, one of the speed range memory locations is in a set condition to indicate the range within which the existing engine speed falls.

Referring again to FIG. 3, the program next proceeds to a step 84 where a pressure range determining routine is executed to determine whether or not the actual pressure measured by the pressure transducer 46 is greater than a respective predetermined pressure associated with each speed range that indicates the concentration of carbon particulates in the filter 14 that will support self-sustaining combustion.

Figure 5:
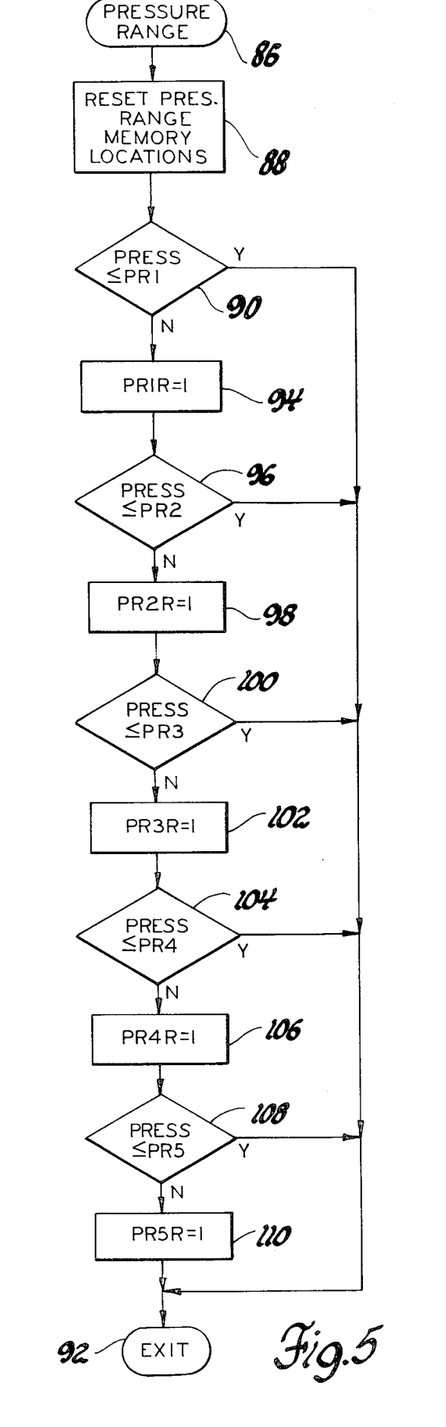

Referring to FIG. 5, the pressure range determining routine is illustrated and is entered at point 86 and proceeds to a step 88 where five pressure range memory locations in the RAM 28 are reset. These RAM memory locations are identified by and represent pressure ranges PR1R through PR5R. These pressure ranges are illustrated in FIG. 8. As seen in this FIG., each pressure range has a specified lower limit and extends without a specified upper limit.

The program next proceeds to a decision point 90 where the actual pressure measured by the transducer 46 is compared with a calibration pressure PR1. Any pressure greater than this value at engine speeds in the speed range RPMR1 represents an accumulation of carbon particulates in the particulate filter 14 at the predetermined concentration which will support self-sustained combustion. If the pressure is less than or equal to this value, the program exits the routine at point 92. If the pressure is greater than this value, the memory location PR1R is set at step 94 to indicate the pressure is in that range which extends down to PR1. The program then proceeds to a decision point 96 where the actual pressure is compared with a calibration pressure PR2. Any pressure greater than this value at engine speeds in the range RPMR2 represents an accumulation of carbon particulates in the filter 14 at the predetermined concentration which will support self-sustained combustion. If the pressure is less than or equal to this value, the program exits the routine. If the pressure is greater than PR2, the memory location PR2R is set at step 98 to indicate the pressure is in that range which extends down to PR2. The program then compares the actual pressure with a calibration pressure PR3 at decision point 100. Any pressure greater than this value at engine speeds in the range RPMR3 represents an accumulation of carbon particulates in the filter 14 at the predetermined concentration which will support self-sustained combustion. If the pressure is less than or equal to this value, the program exits the routine. If the pressure is greater than PR3, the program proceeds to step 102 where the memory location PR3R is set to indicate the pressure is in that range which extends down to PR3. The program next proceeds to decision point 104 where the actual pressure is compared with a calibration pressure PR4. Any pressure greater than this value at engine speeds in the range RPMR4 represents an accumulation of carbon particulates in the particulate filter 14 at the predetermined concentration which will support self-sustained combustion. If the pressure is less than or equal to PR4, the program exits the routine. However, if the pressure is greater than PR4, the program proceeds to a step 106 where the memory location PR4R is set to indicate the pressure is in that range which extends down to PR4. The program then proceeds to a decision point 108 where the actual pressure is compared with a calibration pressure PR5. Any pressure higher than this value at engine speeds in the speed range RPMR5 represents an accumulation of carbon particulates in the particulate filter 14 at the predetermined concentration which will support self-sustained combustion. If the pressure is less than or equal to PR5, the program exits the routine. If the pressure is greater than this value, the program proceeds to a decision point 110 where the memory location PR5R is set to indicate the pressure is in that range which extends down to PR5. Thereafter, the program exits the routine.

Returning to FIG. 3, the program next proceeds to a step 112 where a timer control routine is executed which initiates and establishes four time periods TD1 through TD4. The first two time periods TD1 and TD2 deal with inhibiting the initiation of a particulate burn even though the speed and pressure conditions may at least temporarily fall within the burn region illustrated in FIG. 8. During engine speed transitions between idle as represented by an engine speed in the speed range RPMR1 and run as represented by engine speeds greater than RPM1, momentary pressure surges during these transient conditions may cause an erroneous indication that the carbon particulates have been accumulated at the predetermined concentration at which burn is to be initiated resulting in indiscriminate burning. To prevent this indiscrimate burning, a burn is inhibited for the time period TD1 which may be 15 seconds when a burn condition is first detected while the engine is in an idle condition represented by the speed range RPMR1. Conversely, a burn is inhibited for a time period TD2 which may be 30 seconds when a burn condition is first detected while the engine is in a run speed range.

The time period TD3 represents the minimum time permitted between successive burns of the particulate filter 14. If a burn is initiated and self-sustained combustion for some reason does not occur resulting in partial regeneration (generally around the glow plug 16), the time period TD3 allows for the particulate filter 14 to build up to the proper concentration of carbon particulates so that upon a reenergization of the glow plug 16, the carbon particulates will undergo self-sustained combustion. In one embodiment, TD3 is ten minutes. The fourth time period TD4 which may be ten seconds represents the period that the glow plug 16 is maintained energized after a burn has been initiated and after the valve 22 is deenergized to redirect the exhaust gases through the particulate filter 14.

Figure 6:
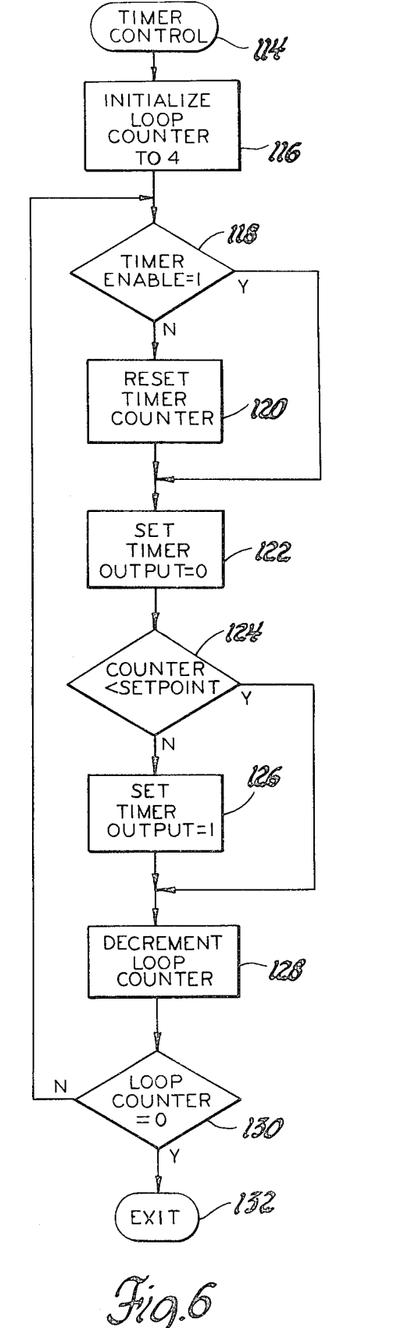

The timer control routine 112 is illustrated in detail in FIG. 6. Referring to this figure, this routine is entered at point 114 and proceeds to a step 116 where a loop counter is set to 4 to enable the timer control routine to be repeated four times, each time corresponding to a respective one of the aforementioned time periods TD1 through TD4. When the loop counter count is at 4, the timer control routine functions relative to the time period TD1.

From the step 116, the program proceeds to a decision point 118 where the state of a RAM 28 memory location TD1IN is sampled. When set, this memory location enables the timing of the time period TD1 and when reset, inhibits timing this period. As will be described, the memory location TD1IN is set when the engine speed is in the engine speed range RPMR1 indicating an engine idle condition.

If the memory location TD1IN is reset indicating an engine off-idle condition, the program proceeds to a step 120 where a TD1 timer counter in the RAM 28 is reset. From step 120, or directly from decision point 118 if the engine is in the idle speed range, the program proceeds to a step 122 where a RAM 28 memory location TD1OUT is reset indicating the time period TD1 has not been timed out. At decision point 124, the TD1 timer counter is compared with a calibration number that represents the time period TD1. If the count is equal to or greater than this calibration number representing expiration of the time period TD1, the program proceeds to a step 126 where the memory location TD1OUT is set to indicate the time period TD1 has been timed out.

After step 126 or directly from decision point 124 if the time period TD1 has not been timed out, the program proceeds to step 128 where the loop counter initialized at step 116 is decremented to 3. At decision point 130 the loop count is compared to zero. Since the count is greater than zero, the program returns to the decision point 118 where the foregoing steps are repeated. However, the count in the loop counter now causes the timer control loop to respond to the state of a memory location TD2IN at step 118 to control timing of the time period TD2 and sets a memory location TD2OUT upon expiration of the time period TD2.

At step 128 the loop counter is decremented to the numeral 2 and the program is returned from decision point 130 to the decision point 118. The new count in the loop counter causes the timer control loop to respond to the state of a memory location TD3IN at step 118 to control timing of the period TD3 and sets a memory location TD3OUT upon expiration of the time period TD3.

At step 128 the loop counter is decremented to the numeral 1 and the program is again returned to decision point 118 via the decision point 130. The loop again is repeated with the count in the loop counter setting the timer control routine to respond to the state of a memory location TD4IN at step 118 to control timing of the time period TD4 and sets a memory location TD4OUT upon expiration of the time period TD4. Thereafter at step 128 the loop counter is decremented to zero after which the program proceeds from decision point 130 to exit the program at step 132.

Returning to FIG. 3, the program next proceeds to step 134 where it is determined if the engine is in the idle speed range RPMR1 and the pressure is in the pressure range PR1R. If the memory locations RPMR1 and PR1R are both set, the memory location TD1IN is set to enable the timing of the time period TD1 as previously described. At the next step 136, the program determines if the engine speed is in a speed range greater than idle and if the pressure is in the corresponding pressure range representing a particulate burn condition. If the memory locations RPMR2 and PR2R are both set, or if the memory locations RPMR3 and PR3R are both set, or if the memory locations RPMR4 and PR4R are both set, or if the memory locations RPMR5 and PR5R are both set, the memory location TD2IN is set to enable the timing of the period TD2 by the timing control routine of FIG. 6 as previously described. Each of the four conditions of step 136 which operate to set the memory location TD2IN represents operation in the burn region of FIG. 8.

Following step 136, the program proceeds to a step 138 where a glow plug enable routine is executed. At this step, a glow plug enable memory location CR2 in the RAM 28 is set if the memory location TD1OUT is set indicating the time period TDI has timed out, or the memory location TD2OUT is set indicating the time period TD2 has timed out, or the glow plug enable memory location CR2 is set, and the memory location TD3OUT is set indicating the time period TD3 has timed out, and TD4OUT is reset. At all other times, the glow plug enable memory location CR2 is reset. During the time period that the glow plug enable memory location CR2 is set, the glow plug is energized as to be described and is heated up until it attains a temperature determined to ignite the carbon particulates and thereafter for the time period TD4. Upon expiration of the time period TD4 after the glow plug has attained the predetermined temperature and after the valve 22 has been deenergized, the glow plug is deenergized.

Following step 138, the program proceeds to a step 140 where a burn hold-off timer enable routine is executed. During this routine, the memory location TD3IN is set each time a burn has been initiated as represented by the glow plug enable memory CR2 shifting to a reset condition. When returned to a reset condition, TD3IN is set to initiate timing of the time period TD3 during which period the glow plug enable memory location CR2 is prevented from being set in accord with the logic previously described.

Following step 140, the program next proceeds to a step 142 where a glow plug extender timer enable routine is executed wherein the memory location TD4IN is set when the glow plug temperature represented by the output of the thermocouple 18 attains a calibration value equal to or greater than the predetermined ignition temperature of the carbon particulates. When this temperature is exceeded, the memory location TD4IN is set to begin timing the time period TD4 after which TD4OUT is set to disable the glow plug by causing the glow plug enable memory location CR2 to be reset.

From step 142, the program proceeds to a step 144 where the output of the discrete input/output circuit 38 is set to provide for energization of the glow plug 16 for the time period that the glow plug enable memory location CR2 is set. At step 146, the program sets the output of the discrete input/output circuit 38 to energize the valve 22 to bypass exhaust gases around the particulate filter 14 whenever both the glow plug enable memory location CR2 is set and the glow plug temperature represented by the output of the thermocouple 18 is below the predetermined ignition temperature of the carbon particulates. At the time the glow plug temperature attains this value, the output of the discrete input/output circuit 38 to the valve 22 is terminated to deenergize the valve 22 and redirect the exhaust gases through the particulate filter 14. Thereafter, the glow plug enable memory location CR2 is maintained in a set condition for the time period TD4.

Following the step 146, the program exits the control loop routine at point 148. The program then again returns to step 54 and is continually repeated. As previously indicated, interrupt pulses are provided at 10 millisecond intervals to the interrupt input A to the microprocessor 24. In response to each interrupt pulse, the control loop 54 is halted and the program executes an interrupt routine as illustrated in FIG. 7. This routine is entered at point 150 and functions to periodically read the engine speed and to increment the various timer counters associated with the time periods TD1 through TD4 previously referred to with respect to the timer control routine of FIG. 6.

The interrupt program proceeds from point 150 to a decision point 152 where an interrupt counter 1 counting the number of 10 millisecond interrupts is compared to a predetermined calibration value A. If the counter has not counted A interrupt periods, the program proceeds to a step 154 where the interrupt counter 1 is incremented. If, however, the number of interrupts counted is equal to A, the program proceeds to read the engine speed at step 156 by monitoring the count in the timer input/output circuit 34 which counts the number of clock pulses between teeth in the ring gear of the engine 10. Thereafter, the interrupt counter 1 is reset at step 158. The steps 152 through 158 provide for the reading of the engine speed each 0.01A second interval.

From steps 154 or 158, the program proceeds to a decision point 160 where the count in an interrupt counter 2 is compared to a calibration constant B. B represents the number of 10 millisecond interrupts between the times that the counters timing the periods TD1, TD2 and TD4 of FIG. 6 are incremented. If the count is less than B, the program proceeds to a step 162 where the interrupt counter 2 is incremented. When the count becomes equal to B, the program proceeds from decision point 160 to step 164 where each of the timer counters described with respect to FIG. 6 associated with the time periods TD1, TD2 and TD4 are incremented. Thereafter, at step 166 the interrupt counter 2 is reset.

Following step 166, the program proceeds to a decision point 168 where the count in an interrupt counter 3 is compared to a calibration constant C. If the count is less than C, the program proceeds to step 170 where the interrupt counter 3 is incremented. When the count becomes equal to C, the program proceeds from decision point 168 to a step 172 where the timer counter described with respect to FIG. 6 associated with the time period TD3 is incremented. Thereafter at step 174 the interrupt counter 3 is reset. Following steps 162, 170 or 174, the program returns to the control loop of FIG. 3 which is continued from the point of interruption.

In one embodiment, A is equal to 14 so that engine speed is read each 140 milliseconds, B is equal to 47 so that the timer counters associated with the time periods TD1, TD2 and TD4 are incremented each 470 milliseconds and C is equal to 10 so that the timer counter associated with the time period TD3 is incremented each 4.7 seconds ($C \times B \times 10$ milliseconds).

The foregoing description of a preferred embodiment of the invention for the purposes of illustrating the invention is not to be considered as restricting or limiting the invention as many modifications may be made by the exercise of skill in the art without departing from the scope of the invention.

The embodiments of the invention in which an exclusive property or privilege is claimed are defined as follows:

1. An exhaust purifying system in combination with a diesel engine having an exhaust conduit into which combustion byproducts including carbon particulates are discharged, the system comprising, in combination:
   means effective to supply fuel to the engine to undergo combustion, the fuel including an agent effective to lower the combustion temperature of the carbon particulates in the combustion byproducts so that a concentrated deposit of the carbon particulates of a predetermined concentration will undergo self-sustained combustion after ignition;
   a filter disposed in the exhaust conduit effective to collect the carbon particulates in the combustion byproducts, the pressure in the exhaust conduit upstream of the filter having a value related to the concentration of the carbon particulates collected by the filter and to the flow rate of the combustion byproducts;
   circuit means responsive to a predetermined engine operating parameter representative of the flow rate of the combustion byproducts effective to provide a schedule of values of pressure in the exhaust conduit upstream of the filter that represents a collection of carbon particulates at the predtermined concentration;
   means effective to measure the predetermined engine operating parameter;
   means effective to measure the pressure in the exhaust conduit upstream of the filter;
   ignition means effective to ignite the carbon particulates collected by the filter at least at one point on the filter when the measured pressure is equal to the scheduled pressure at the measured engine operating parameter to regenerate the filter through self-sustained combustion of the carbon particulates; and
   means effective to inhibit the ignition means from igniting the carbon particulates for a predetermined time period following each ignition of the carbon particulates, the time period allowing the particulates to accumulate to the predetermined concentration in all areas of the filter in the event self-sustained combustion did not occur resulting in partial regeneration of the filter.

* * * * *